United States Patent [19]

El-Naggar et al.

[11] Patent Number: 5,061,866
[45] Date of Patent: Oct. 29, 1991

[54] ANALOG, CONTINUOUS TIME VECTOR SCALAR MULTIPLIER CIRCUITS AND PROGRAMMABLE FEEDBACK NEURAL NETWORK USING THEM

[75] Inventors: Mohammed I. El-Naggar; Nabil I. Khachab, both of Columbus, Ohio

[73] Assignee: The Ohio State University Research Foundation, Columbus, Ohio

[21] Appl. No.: 564,027

[22] Filed: Aug. 6, 1990

[51] Int. Cl.$^5$ .............................................. G06G 7/16
[52] U.S. Cl. .................................... 307/529; 307/201; 364/841
[58] Field of Search ...................... 307/201, 529, 491; 364/807, 841

[56] References Cited

U.S. PATENT DOCUMENTS

| | | | |
|---|---|---|---|
| 4,101,966 | 7/1978 | Uzunoglu | 364/841 |
| 4,387,439 | 6/1983 | Lin | 364/841 |
| 4,660,166 | 4/1987 | Hopfield | 364/807 |
| 4,874,963 | 10/1989 | Alspector | 307/201 |
| 4,875,183 | 10/1989 | Graf et al. | 307/201 X |
| 4,903,226 | 2/1990 | Tsividis | 364/807 |
| 4,950,917 | 8/1990 | Holler et al. | 307/529 X |
| 4,956,564 | 9/1990 | Holler et al. | 307/529 X |
| 4,978,873 | 12/1990 | Shoemaker | 307/201 X |

OTHER PUBLICATIONS

Kashkin et al, "Four-Quadrant Analog Signal Multiplier" Instrum. & Exp. Tech. (U.S.A.) vol. 22, No. 2, 10-1979, pp. 155-161.

Primary Examiner—David Hudspeth
Attorney, Agent, or Firm—Frank H. Foster

[57] ABSTRACT

A four quadrant, analog multiplier circuit useful for MOS implementation of feedback/feedforward neural networks. The multiplier circuit uses only one op-amp and one pair of input MOS FETs. It becomes a multiplier/summer by the addition of only one additional pair of input FETs for each additional product to be summed and achieves the vector scalar product of 2 n-tuple vector inputs using only $2(n+1)$ MOS transistors.

13 Claims, 4 Drawing Sheets

ANALOG, CONTINUOUS TIME VECTOR SCALAR MULTIPLIER CIRCUITS AND PROGRAMMABLE FEEDBACK NEURAL NETWORK USING THEM

TECHNICAL FIELD

This invention relates generally to electronic circuitry for information processing and more particularly relates to vector scalar product circuits and the use of such product circuits in the construction of neuron circuits and neural networks analogous to the Hopfield type.

BACKGROUND ART

Neural networks are electronic circuits for processing information and emulate the functions of the biological neuron of the human brain. They provide an approach which is an alternative to information processing in the modern and popular digital computers in which information is processed by the step by step execution of a series of programmed instructions. Neural networks possess large computational power which is more suitable for some information processing applications, such as image, speech, and pattern recognition, communication systems, machine vision, and robotics.

In a neural network many individual computing elements called neurons are densely interconnected. Typically, each neuron receives several inputs from many other neurons and has a single output, although the output may be both an output voltage and its complement. In a generalized neural network, each neuron receives an input from the output of each other neuron. Each coupling from a neuron output to a neuron input may be strong or weak and its strength, called the synaptic weight, is desirably controllable over a range of values.

Figure 7:
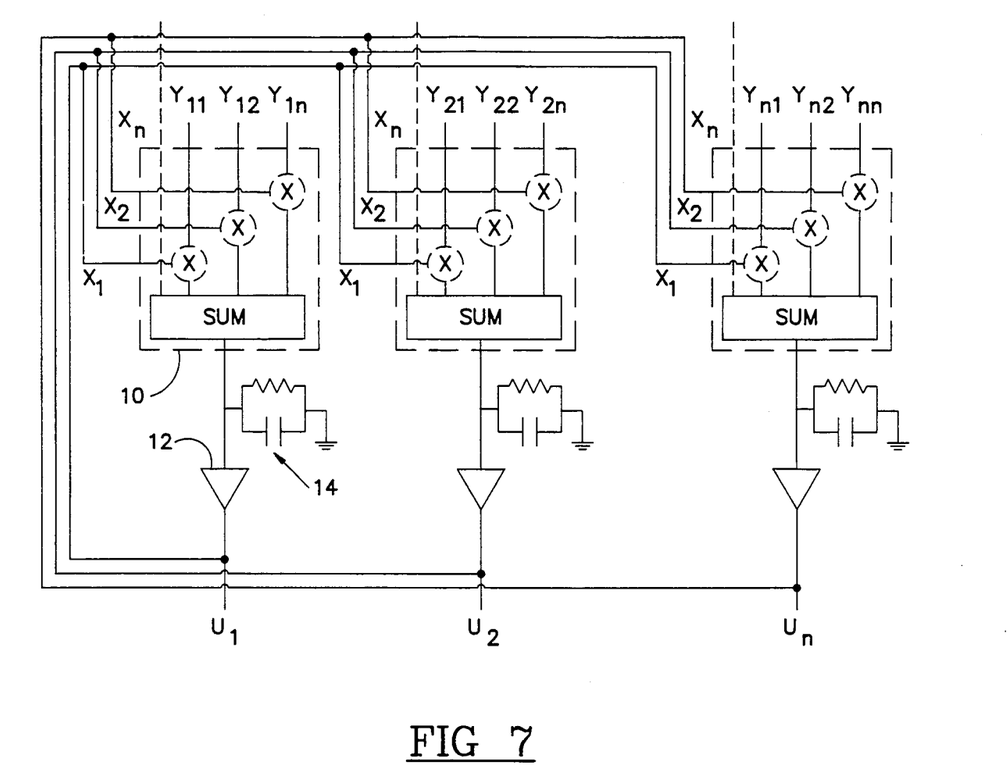
FIGS. 7-9 show further embodiments of the invention.

Hopfield proposed a neural network circuit model in, e.g. "Simple Neural Optimization Networks: an A/D converter, a signal decision circuit, and a linear programming circuit" by J. J. Hopfield and D. W. Tank, *IEEE Transactions on Circuits and Systems*, vol. CAS-33, No. 5, May 1986, pages 533-541. FIG. 7 illustrates an application of the present invention to a neural network of the Hopfield type and therefore may be referred to in connection with an explanation of the Hopfield neural network model.

FIG. 7 illustrates an n-neuron neural network, each neuron including a multiplier/summer, boxed in dashed lines, the output of which is connected to a double inverter. For example, neuron 1 has a multiplier/summer 10 and a double inverter 12. Also illustrated are a parallel resistance and capacitance 14 representing the parasitic input impedance inherent in a practically implemented double inverter.

The synaptic weight $Y_{ij}$ defines for each neuron input the extent to which an input of the i-th neuron is driven by the output of the j-th neuron. Thus, for example, in FIG. 7 $Y_{11}$ is the extent to which the input to neuron 1 from the output of neuron 1 drives the first neuron. A negative value of $Y_{ij}$ indicates that the j-th neuron inhibits the i-th neuron. Thus, each input to a neuron is represented by the product of two multiplicand voltages, one multiplicand being an input from a neuron circuit output and the other multiplicand being the synaptic weight assigned to that input. The synaptic weight is controlled off chip by the application of a DC control voltage of a suitable level for selecting the desired synaptic weight. The multiplier/summer circuit component of each neuron circuit, i.e. the i-th neuron, desirably achieves a vector scalar product in the form:

$$\sum_{j=1}^{n} Y_{ij} X_j \qquad \text{I.}$$

where $X_j$ is the output from the j-th neuron and $Y_{ij}$ is the assigned positive or negative synaptic weight that is realized through voltage levels.

The output of the multiplier/summer represents the product of two n-tuple vector inputs. One n-tuple vector input is represented by its vector components $Y_{11}$, $Y_{12}, \ldots Y_{1n}$, and the other vector input is represented by its vector components $X_1$, $X_2$, and $X_n$. Thus, desirably each multiplier/summer is an analog device, the output of which provides the sum of products represented by equation I. This product is in the form of the well known vector or cross product and scalar or dot product used in vector analysis.

As is known in the prior art, a double inverter, such as double inverter 12 in FIG. 7, may be utilized in the realization of the neuron circuit. The double inverter provides an output which is a sigmoidal function of its input. It is a very high gain amplifier providing an S-shaped non-linearity. It operates as a non-linear limiter to provide an output at one of two discrete output levels, $+V$ or $-V$, depending upon whether its input is greater than or less than a selected level.

A neuron network of the Hopfield type will settle into one of a limited number of steady-state equilibria for each set of inputs and synaptic weights. The synaptic weights are desirably programmable off chip by application of suitable voltage levels to enable the neural network to be designed for the solution of various problems. Changing the synaptic weight alters the location and number of the steady-state equilibria of the network.

Because neural networks are highly complex and have dense interconnectivities, the only practical implementation is in very large scale integrated circuits. It is therefore highly desirable that such circuits be implemented in metal oxide semiconductor, field effect transistor form, utilizing the fewest possible number of FET devices, while preserving the basic functional properties of the neuron circuit. It is also desirable that they use simple analog component cells that make effective use of CAD tools, occupy small area and are versatile, programmable, easy to design, and minimize the interconnectivities between the cells.

In the patent application of Salam and Ismail, Ser. No. 348,309, filed May 5, 1989, a multiplier circuit and feedback neural networks using their circuit were disclosed. However, the circuit of that patent application requires the use of twice as many FET devices as are utilized in the circuit of the present invention.

BRIEF DISCLOSURE OF INVENTION

The invention is a vector scalar analog multiplier circuit and neural networks utilizing the multiplier/summer embodiment of the circuit. The multiplier circuit of the present invention provides an output voltage which is a linear function of the product of the amplitudes of at least one pair of input multiplicand voltages. The multiplier circuit has an operational amplifier having an inverting input and a non-inverting input which is connected to common or ground. The op-amp has one output in its unbalanced form and two outputs in its balanced form.

A feedback resistance is connected between the output and the inverting input. In its balanced form the feedback resistance has two component parts, one extending from the inverting input to one output and the second extending from the inverting input to the second output. Preferably, the feedback resistance comprises a pair of matched, field effect transistors. In the unbalanced form, both field effect transistors have their source-drain terminals connected between the inverting input and the output of the operational amplifier. In the balanced form one field effect transistor has its source-drain terminals connected between one output and the inverting input and the other field effect transistor has its source-drain terminals connected between the second output and the inverting input. Preferably, the gate of one feedback field effect transistor is connected to a scaling/gain control voltage. If the matched feedback transistors are depletion mode devices, the gate of the second feedback FET is also connected to the output to which its source or drain is connected. If the second feedback FET is an enhancement mode device, its gate is connected to the output to which its source or drain is connected through an interposed DC level shifting circuit to impose a DC bias upon the signal for attracting carriers into the channel of the FET.

The multiplier/summer circuit has a plurality of sets of multiplication field effect transistors. Each set has two matched field effect transistors and one such set of two FETs is utilized for realizing each product of two vector components. A plurality of sets are used to obtain the sum of a plurality of products.

A first one of the two field transistors of each multiplication set has its source and drain terminals connected between the inverting input of the operational amplifier and a first multiplier circuit input terminal. A first input multiplicand voltage is applied to this first input terminal. This first field effect transistor has its gate connected either directly to a second multiplier circuit input terminal, to which the second input multiplicand voltage is applied if it is a depletion mode device, and has its gate connected to that second multiplier circuit input terminal through an interposed DC voltage level shifting circuit if it is an enhancement mode device.

The second field effect transistor of each multiplication set has its source and drain terminals connected between the inverting input of the operational amplifier and a third multiplier circuit input terminal to which a third input voltage is applied. This third input voltage is the complement of the first multiplicand voltage, that is it has the same amplitude as the first multiplication voltage and the opposite polarity. The gate of the second field effect transistor is connected directly to the third multiplier circuit input terminal if it is a depletion mode device and is connected through an interposed DC voltage level shifting circuit if it is an enhancement mode device.

A neuron circuit is provided by connecting the output of the multiplier/summer circuit to a circuit means, such as a double inverter, which provides an output which is a sigmoidal function of its input and has its input connected to the output of the operational amplifier.

It is a principal advantage and feature of the invention that it provides a four quadrant multiplier/summer which achieves the vector scalar product of 2 n-tuple, vector inputs using only 2(n+1)MOS FET transistors. Thus, only two additional MOS transistors are needed, connected to the inverting input of the operational amplifier, for each additional pair of inputs needed to produce an additional product which is summed in the circuit.

The invention therefore enables the implementation of neural networks at less cost, requiring less space on the chip and consuming less power for each product, thus facilitating implementation in monolithic form, such as in VLSI. The new circuit is input/output compatible with no restrictions on the fan-in/fan-out capability.

Yet another advantage of the present invention is that it can use either depletion mode or enhancement mode FET devices. The only substantial difference between the two embodiments of the invention is a simple DC level shift. Enhancement mode devices are sometimes preferred because of the reduced cost, resulting from the elimination of one masking step.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. Additionally, as is well known in the art, the connection of source-drain terminals of some FETs may be interchanged and yet provide equivalent operation.

DETAILED DESCRIPTION

Figure 1:
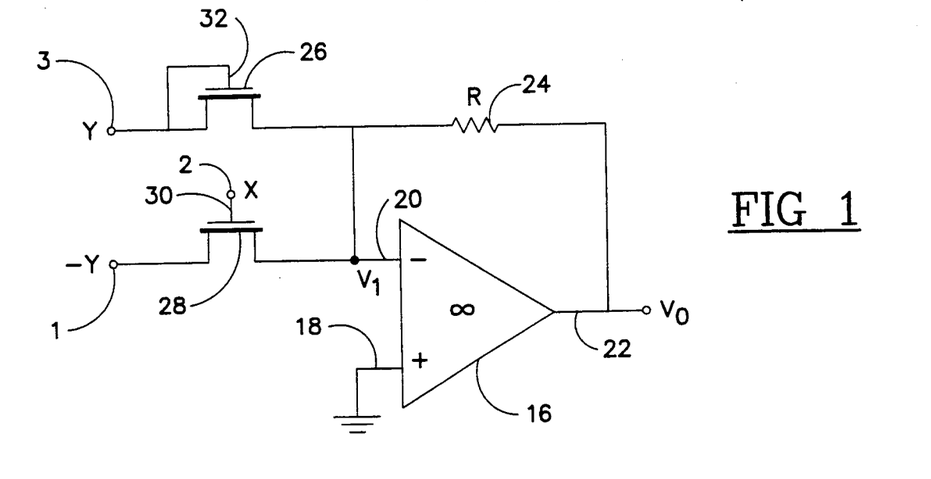
FIG. 1 is a schematic diagram illustrating the basic multiplier cell of the present invention utilizing an unbalanced op-amp and depletion mode field effect transistors.

FIG. 1 illustrates a multiplier cell embodying the invention. The circuit is an analog multiplier circuit for providing an output voltage $V_0$ which is a linear function of the product of the amplitudes of at least one pair of input multiplicand voltages. One multiplicand voltage is applied at input terminal 1 and the second is applied to input terminal 2. The complement of input voltage 1 is applied to input terminal 3. The circuit has an operational amplifier 16 which typically has a very high gain, designated as infinite for practical purposes on the circuit diagram. It also has a non-inverting input 18 which is connected to common, an inverting input 20, and an output terminal 22. A feedback resistance 24 is connected between the output 22 and the inverting input 20.

The circuit is further provided with a set of two multiplication field effect transistors 26 and 28. The first field effect transistor 26 of the set has its source and drain terminals connected between the inverting input 20 and the first multiplier circuit input terminal 1 to which a first input multiplicand voltage is applied. This first field effect transistor also has its gate 30 connected directly to the second multiplier circuit input terminal 2, to which the second input multiplicand voltage is applied.

The second field effect transistor 26 of the set of two transistors has its source and drain terminals connected between the inverting input 20 and the third multiplier circuit input terminal 3 to which a third input voltage is applied. The third input voltage has the same amplitude as the first multiplicand voltage, but is of opposite polarity. The gate 32 of the second field effect transistor 26 is connected directly to the third multiplier circuit input terminal 3.

Figure 2:
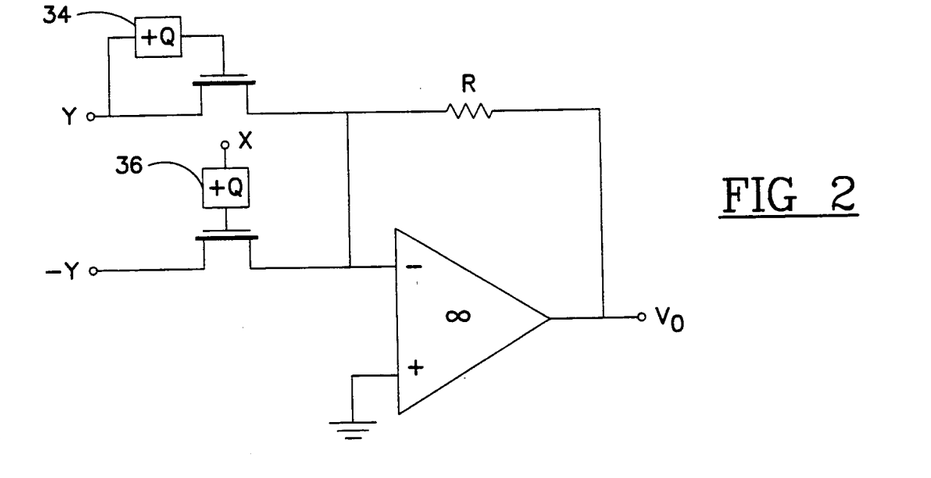
FIG. 2 is a schematic diagram illustrating a basic multiplier cell like that illustrated in FIG. 1, except using enhancement mode field effect transistors.

FIG. 2 illustrates the same multiplier cell except that it utilizes enhancement mode FET devices. Since an enhancement mode FET requires a DC bias to attract carriers into the channel, the circuit of FIG. 2 additionally has DC bias or level shifting circuits 34 and 36 interposed in the connection of the gates. Since such circuits are well known to those skilled in the art and are simple DC level shifting circuits, they are not disclosed in more detail. In other respects, the circuit of FIG. 2 is essentially identical to the circuit of FIG. 1.

Figure 3:
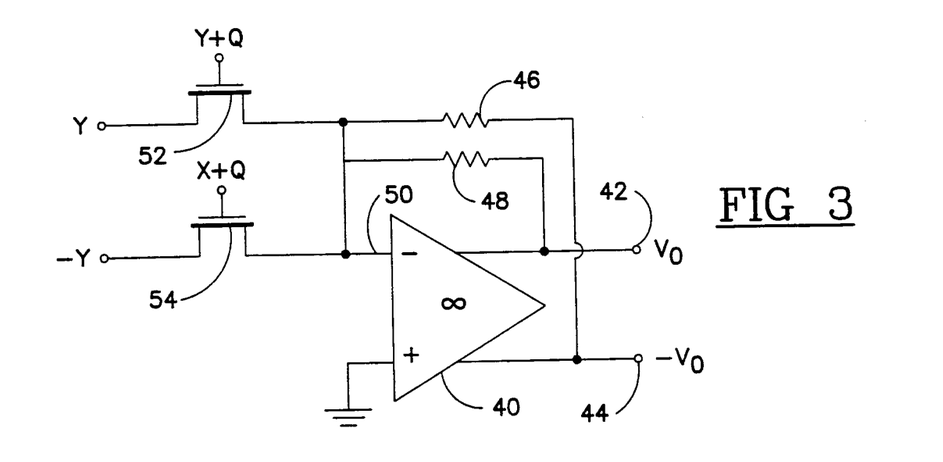
FIG. 3 is a schematic diagram of a basic multiplier cell embodying the present invention, but using a balanced operational amplifier and using enhancement mode field effect transistors.

FIG. 3 illustrates a multiplier cell like those illustrated in FIGS. 1 and 2 but modified for a balanced output op-amp 40. The balanced op-amp 40 is characterized by its dual outputs 42 and 44 which provide both output voltage $V_0$ and its compliment $-V_0$. In the balanced embodiment, the feedback resistance has two component resistances 46 and 48. One component resistance 48 is connected between the inverting input 50 and the output 42, while the other component resistance 46 is connected between the inverting input 50 and the output 44. Because the circuit of FIG. 3 is illustrated with enhancement mode FETs 52 and 54, the level shifting voltage Q is also illustrated. It should be understood, however, that the balanced embodiment may also be implemented using depletion mode field effect transistors in which event the set of field effect transistors, consisting of transistors 52 and 54, would be arranged as illustrated in FIG. 1.

The field effect transistors in the present invention are operated in their triode or linear region.

Mathematical circuit analysis may be applied to the embodiments of the invention illustrated in FIGS. 1-3 to demonstrate their operation. For example, Kirchoff's Current Law may be applied to the node at the inverting input 20 of FIG. 1, at which voltage $V_0$ appears and by using the drain current equation:

$$I_D = \mu C_{ox} \left[ (V_{GS} - V_{TB})V_{DS} - \frac{V_{DS}^2}{2} \right] \frac{W}{L} \qquad \text{II.}$$

The result is obtained that the output voltage $V_0$ is given by:

$$V_0 = \mu C_{ox} \left( \frac{W}{L} \right)_{in} RXY \qquad \text{III.}$$

where $(W/L)_{in}$ is the width to length ratio of the input transistors.

In order to insure that the MOS transistors are operating in the triode region, the following condition is imposed at the input:

$$|X + Y| \leq |V_{TB}| \qquad \text{IV.}$$

where $V_{TB}$ is the threshold voltage of the MOS devices.

Equation III further implies that four quadrant multiplication of the two signals is achieved.

Figure 4:
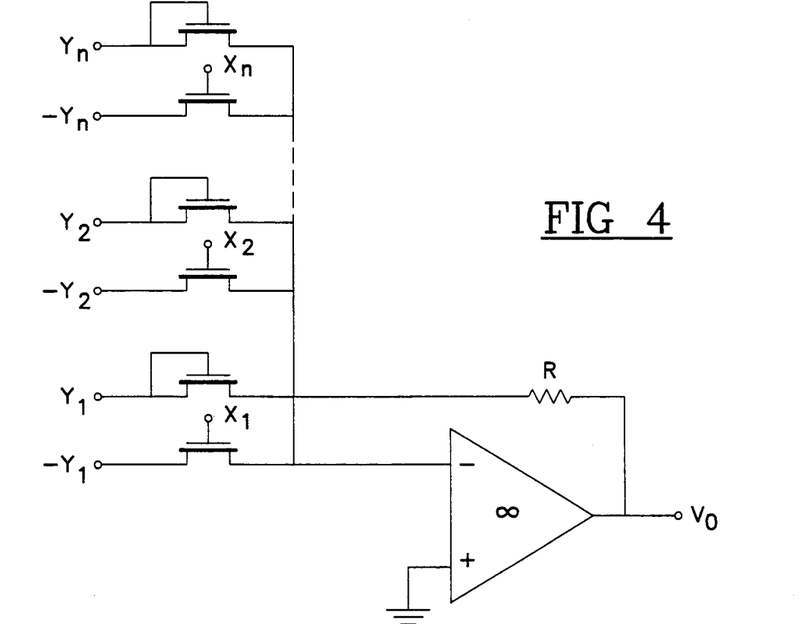
FIG. 4 is a schematic diagram illustrating a multiplier/summer circuit of the present invention utilizing a cell of the type illustrated in FIG. 1.

FIG. 4 illustrates the extension of the principles of the invention as illustrated in FIGS. 1-3 to achieve vector scalar products by the addition of one additional set of matched field effect transistors for each additional vector component multiplication so that the circuit of FIG. 4 provides an output which is proportional to the sum of several products. For example, FIG. 4 illustrates a circuit providing an output which is proportional to the sum of the products $X_1Y_1 + X_2Y_2 + \ldots X_nY_n$. In particular, from circuit analysis the circuit of FIG. 4 provides the vector scalar product of the form:

$$V_0 = \mu C_{ox} \left[ \left( \frac{W}{L} \right)_1 X_1Y_1 + \ldots + \left( \frac{W}{L} \right)_n X_nY_n \right] R \qquad \text{V.}$$

Therefore, it can be seen that the output of the circuit of FIG. 4 provides the product of 2 n-tuple vectors X and Y having n components per vector.

Of course, other embodiments utilizing enhancement mode field effect transistors and balanced operational amplifiers, utilizing the principles illustrated in FIGS. 1-3, may also be constructed in accordance with the present invention as alternatives to the circuit illustrated in FIG. 4.

Figure 5:
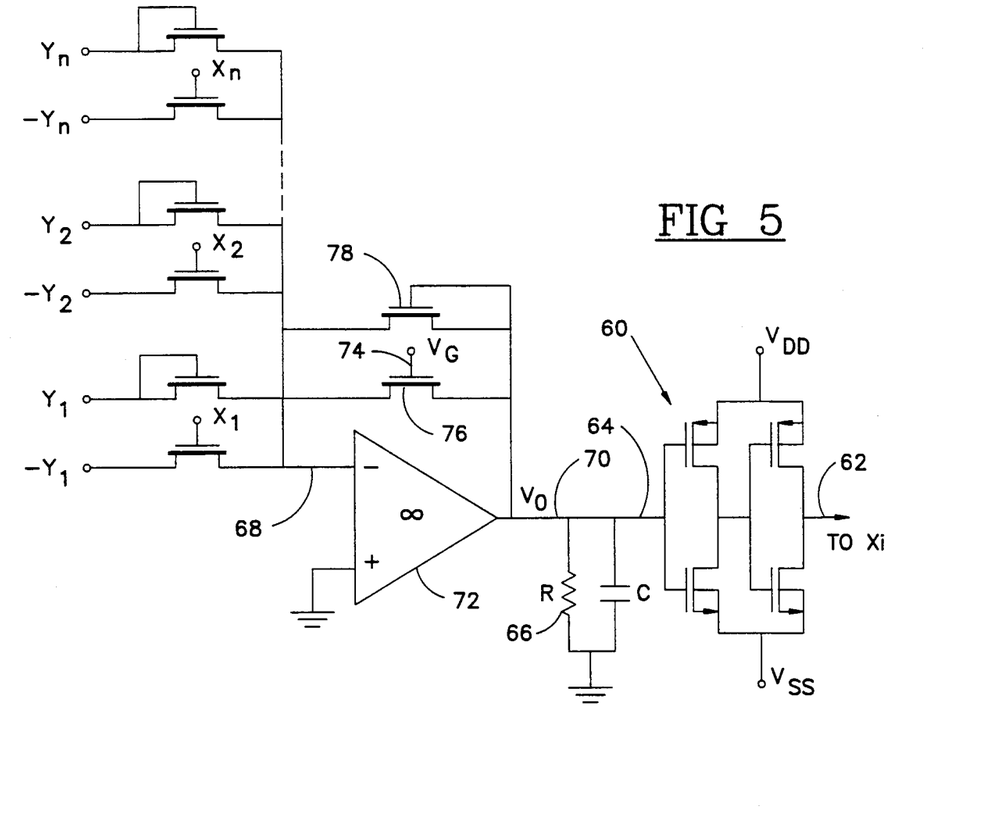
FIG. 5 is a schematic diagram illustrating a neuron circuit utilizing the multiplier/summer of FIG. 4.

FIG. 5 illustrates a neuron circuit utilizing a conventional, double inverter 60, providing an output 62 which is a sigmoidal function of its input 64, connected to the multiplier/summer circuit of the type illustrated in FIG. 4. Also illustrated is the parasitic impedance 66 as the resistance and capacitance which is inherent at the input of the double inverter 60.

FIG. 5 also illustrates the manner of achieving an all MOS realization of the circuits illustrated in FIGS. 1-4. The feedback resistor is replaced by MOS field effect transistors operating in the triode region. For the balanced operational amplifier, the feedback resistance is replaced by a pair of matched field effect transistors having their source-drain terminals connected between the inverting input 68 and the output 70 of the op-amp 72. As shown in FIG. 5, the gate 74 of one of the feedback field effect transistors 76 may be connected to a scaling/gain control voltage to tune the value of the effective feedback resistance to a desired, effective feedback resistance. This allows off chip control of a scaling factor or gain for the voltage $V_0$ at output 70 for additional off chip program control. The gate of the second feedback field effect transistor 78 is connected directly to the output terminal 70.

Figure 8:
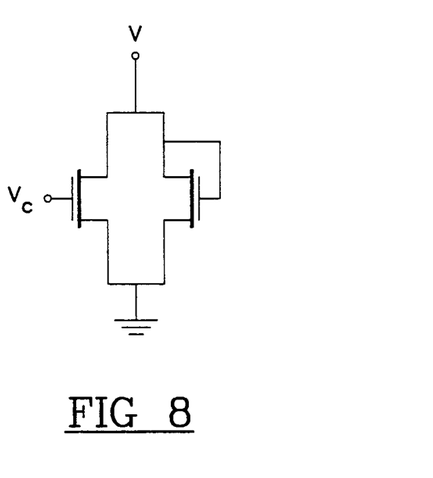
Figure 9:
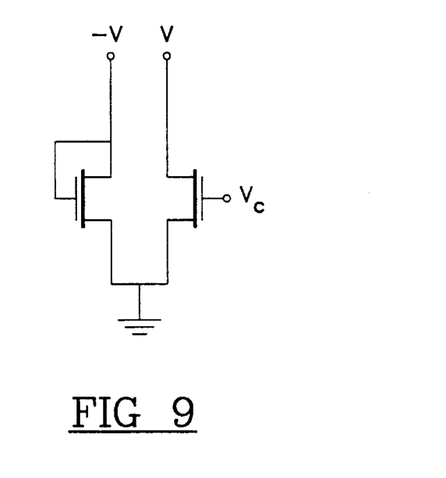

The resistance value of the pair of field effect transistors operating as an equivalent feedback resistance are given respectively for the configurations of FIGS. 8 and 9 as:

$$R = \frac{1}{\mu C_{ox} \left(\frac{W}{L}\right)_0 (V_c - 2V_{TB})} \quad \text{VI.}$$

$$R = \frac{1}{\mu C_{ox} \left(\frac{W}{L}\right)_0 V_c} \quad \text{VII.}$$

where $V_c$ is a DC control voltage used to tune the equivalent resistance value of the MOS transistor.

For linear operation, the following restriction applies at the output:

$$V_0 + V_C \leq |V_{TB}| \quad \text{VIII}$$

Moreover, the equivalent feedback resistance configuration of FIG. 8 is dependent upon the threshold voltage $V_{TB}$ as given by equation V. But the equivalent feedback resistance configuration of FIG. 9 is independent of $V_{TB}$, although it requires a fully balanced output operational amplifier.

The field effect transistors, when used for the feedback resistance or when used for the multiplier inputs, are used in matched pairs in order to cancel even order nonlinearities. In the absence of such nonlinearity cancellation, the circuit is useful over only a very small range of voltage amplitudes. This cancellation of even order nonlinearity greatly extends the useful range of operation, the odd order nonlinearities being relatively insignificant.

Figure 6:
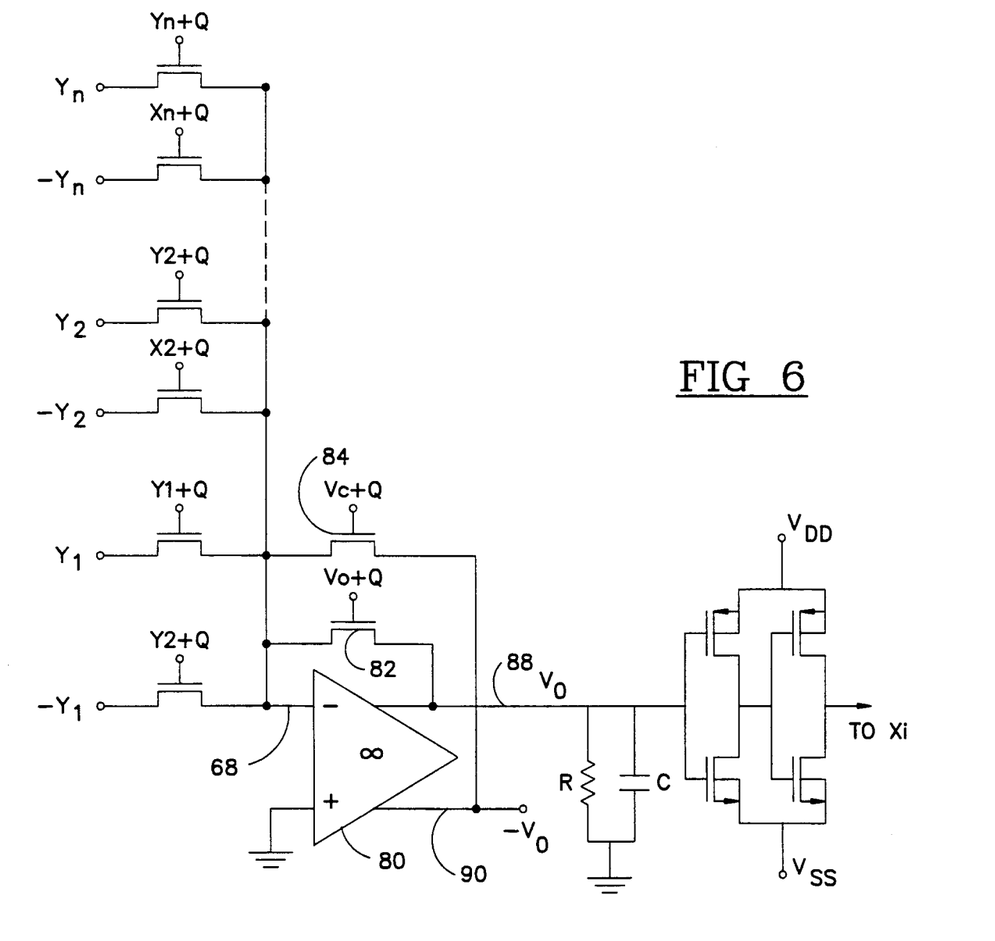
FIG. 6 is a schematic diagram of a neuron circuit, but utilizing the multiplier cell illustrated in FIG. 3.

The concepts illustrated in FIG. 5 may also be implemented using enhancement mode field effect transistors and/or using balanced operational amplifiers in the manner previously discussed. For example, FIG. 6 illustrates an embodiment utilizing enhancement mode field effect transistors and balanced operational amplifier 80. As previously described, however, the conventional level shifting bias voltage must be applied to the transistor gates to attract carriers into the channel for enhancement mode transistors. Additionally, the balanced output utilizes a balanced feedback resistance having the configuration of the type illustrated in FIG. 9. Thus, with the balanced operational amplifier 80 illustrated in FIG. 6, the pair of feedback field effect transistors 82 and 84 have their source-drain terminals of one transistor 82 connected between the inverting input 86 and output 88 and the source-drain terminals of the other transistor 84 connected between the inverting input 86 and the complement output 90.

Circuits of the type illustrated in FIGS. 5 and 6 can be used to implement feedback neural networks of the Hopfield type. Such a neural network is illustrated in FIG. 7. In FIG. 7 the synaptic weights are represented by the $Y_{ij}$ connections. They are multiplied by the $X_j$ feedback connections from the $V_j$ outputs from the double inverters of the respective neuron circuits The input $X_i$ to neuron i will lag behind the instantaneous output $V_j$ of the other neuron due to the parasitic input capacitance $c_i$ of the cell membrane, the transmembrane conductance and the finite conductance. The following differential equation dictates the rate of change of $X_i$:

$$C_i \left[\frac{du_i}{dt}\right] = \sum_j T_{ij} V_j - \frac{u_i}{R_i} + I_i \quad \text{IX.}$$

The input-output static relation of the neuron is given by a sigmoidal-type function g(.) as:

$$u_i = g_i^{-1} [v_i] \quad \text{X.}$$

where, $$R_i^{-1} = p_i + \sum_j T_{ij}. \quad \text{XI.}$$

In the Hopfield model, both the output and its complement are fed back because it is impossible to implement negative resistors. However, in the present invention it is not necessary to feed back the output complement. Equation V verifies that both positive and negative synaptic weights may be applied in the circuit of the present invention. Because the complement is not required to be fed back, interconnections between neurons are reduced, resulting in an economic VLSI implementation. Equation V verifies that circuits embodying the present invention provide the sum of product realization needed for Hopfield Analog Neural Network application.

For neural networks utilizing the present invention, $V_{TB}$ is of no disadvantage for their functionality. Therefore, the MOS resistance realization of FIG. 8 can be used. The output of $V_0$ of the vector scalar product is, when the MOS field effect transistor feedback resistances are used, then given by:

$$V_o = \frac{1}{\left(\frac{w}{L_0}\right)(V_c - 2V_{TB})} \quad \text{XII.}$$

$$\left[\left(\frac{W}{L}\right)_1 X_1 Y_1 + \ldots + \left(\frac{W}{L}\right)_n X_n Y_n\right]$$

From equation XII it is apparent that the output voltage is conveniently programmable by the control voltage $V_c$, adding to the versatility and flexibility of circuits embodying the present invention.

Therefore it can be seen that the present invention provides a new MOS implementation of the synaptic weights of feedback neural networks. Circuits embodying the present invention are extremely simple to design, versatile, have a programmed output voltage, and, most importantly, offer an economical way for the silicon implementation of such networks, principally by the 50% reduction in the number of MOS field effect transistors required to just 2(n+1) MOS transistors for the product of two n-tuple vector inputs.

While certain preferred embodiments of the present invention have been disclosed in detail, it is to be understood that various modifications may be adopted without departing from the spirit of the invention or scope of the following claims.

We claim:

1. An analog multiplier circuit for providing an output voltage which is a linear function of the product of the amplitudes of at least one pair of input multiplicand voltages, the multiplier circuit comprising:

(a) an operational amplifier having an inverting input, a non-inverting input connected to common and at least one output forming the multiplier circuit output;

(b) a feedback resistance connected between each said output and the inverting input;

(c) at least one set of multiplication field effect transistors, each set having two matched field effect transistors, (i) a first one of the field effect transistors of each set having its source and drain terminals connected between the inverting input of the operational amplifier and a first multiplier circuit input terminal to which a first input multiplicand voltage is applied, the first field effect transistor having its gate connected directly to a second multiplier circuit input terminal to which the second input multiplicand voltage is applied if it is a depletion mode device and connected through an interposed DC voltage level shifting circuit if it is an enhancement mode device;

(ii) the second field effect transistor of each set having its source and drain terminals connected between said inverting input and a third multiplier circuit input terminal to which a third input voltage is applied having the same amplitude as said first multiplicand voltage and the opposite polarity, the gate of the second field effect transistor connected directly to said third multiplier circuit input terminal if it is a depletion mode device and connected through an interposed DC voltage level shifting circuit if it is an enhancement mode device 2. A circuit in accordance with claim 1 wherein there are a plurality of said sets of matched field effect transistors, each set for multiplying two multiplicand voltages, the output of said operational amplifier being a linear function of the sum of a plurality of the products of pairs of input multiplicand voltages.

3. A circuit in accordance with claim 2 wherein a circuit means for providing an output which is a sigmoidal function of its input is connected to the output of the operational amplifier whereby the entire circuit operates as a neuron circuit.

4. A circuit in accordance with claim 1 or 2 or 3 wherein the feedback resistance comprises a pair of matched field effect transistors having their source-drain terminals connected between the inverting input and the single output if the op-amp is an unbalanced type and one to each output if the op-amp is a balanced device.

5. A circuit in accordance with claim 4 wherein the gate of one feedback FET is connected to a scaling-/gain control voltage and the gate of the other FET is connected directly to the output to which said other FET is connected if it is a depletion mode device and connected through an interposed DC level shifting circuit if it is an enhancement mode device.

6. An analog multiplier/summer circuit for providing an output voltage which is a linear function of the sum of a plurality of products of the amplitudes of pairs of input multiplicand voltages, the multiplier/summer circuit comprising:

(a) an operational amplifier having an inverting input, a non-inverting input connected to common and at least one output forming the multiplier circuit output;

(b) a feedback resistance connected between each said output and the inverting input;

(c) a plurality of sets of multiplication field effect transistors, each set having two matched field effect transistors, (i) a first one of the field effect transistors of each set having its source and drain terminals connected between the inverting input of the operational amplifier and a first multiplier circuit input terminal to which a first input multiplicand voltage is applied, the first field effect transistor having its gate connected directly to a second multiplier circuit input terminal to which the second input multiplicand voltage is applied if it is a depletion mode device and connected through an interposed DC voltage level shifting circuit if it is an enhancement mode device;

(ii) the second field effect transistor of each set having its source and drain terminals connected between said inverting input and a third multiplier circuit input terminal to which a third input voltage is applied having the same amplitude as said first multiplicand voltage and the opposite polarity, the gate of the second field effect transistor connected directly to said third multiplier circuit input terminal if it is a depletion mode device and connected through an interposed DC voltage level shifting circuit if it is an enhancement mode device.

7. A circuit in accordance with claim 6 wherein the feedback resistance comprises a pair of matched field effect transistors having their source-drain terminals connected between the inverting input and the single output if the op-amp is an unbalanced type and one to each output if the op-amp is a balanced device.

8. A circuit in accordance with claim 7 wherein the gate of one feedback FET is connected to a scaling-/gain control voltage and the gate of the other FET is connected directly to the output to which said other FET is connected if it is a depletion mode device and connected through an interposed DC level shifting circuit if it is an enhancement mode device.

9. A circuit in accordance with claim 8 wherein a circuit means for providing an output which is a sigmoidal function of its input is connected to the output of the operational amplifier.

10. A neuron circuit for providing an output at one of two discrete levels as a function of the sum of the products of the amplitudes of respective pairs of multiplicand voltages, the neuron circuit comprising:

(a) an operational amplifier having an inverting input, a non-inverting input connected to common and at least one output forming the multiplier circuit output;

(b) a feedback resistance connected between each said output and the inverting input;

(c) a plurality of sets of multiplication field effect transistors, each set having two matched field effect transistors, (i) a first one of the field effect transistors of each set having its source and drain terminals connected between the inverting input of the operational amplifier and a first multiplier circuit input terminal to which a first input multiplicand voltage is applied, the first field effect transistor having its gate connected directly to a second multiplier circuit input terminal to which the second input multiplicand voltage is applied if it is a depletion mode device and connected through an interposed DC voltage level shifting circuit if it is an enhancement mode device;

(ii) the second field effect transistor of each set having its source and drain terminals connected between said inverting input and a third multiplier circuit input terminal to which a third input voltage is applied having the same amplitude as said first multiplicand voltage and the opposite polarity, the gate of the second field effect transistor connected directly to said third multiplier circuit input terminal if it is a depletion mode device and connected through an interposed DC voltage level shifting circuit if it is an enhancement mode device.

(d) circuit means connected to the output of the operational amplifier for providing an output which is a sigmoidal function of its input.

11. A circuit in accordance with claim 10 wherein the feedback resistance comprises a pair of matched field effect transistors having their source-drain terminals connected between the inverting input and the single output if the op-amp is an unbalanced type and one to each output if the op-amp is a balanced device.

12. A circuit in accordance with claim 11 wherein the gate of one feedback FET is connected to a scaling-/gain control voltage and the gate of the other FET is connected directly to the output to which said other FET is connected if it is a depletion mode device and connected through an interposed DC level shifting circuit if it is an enhancement mode device.

13. A neural network including neuron circuits in accordance with claim 10 or 11 or 12 and comprising:
a plurality of said neuron circuits, the output of each sigmoidal function circuit means connected as a multiplicand voltage to one set of multiplicand field effect transistors of each neuron circuit.

* * * * *

UNITED STATES PATENT AND TRADEMARK OFFICE
CERTIFICATE OF CORRECTION

PATENT NO. : 5,061,866
DATED : October 29, 1991
INVENTOR(S) : Mohammed I. El-Naggar and Nabil I. Khachab It is certified that error appears in the above-identified patent and that said Letters Patent is hereby corrected as shown below:

Column 1, line 5, the following paragraph should be inserted:

--This invention was made with Government support under Project No. MIP 8896244, awarded by the National Science Foundation. The Government may have certain rights in this invention.--

Signed and Sealed this

Sixteenth Day of March, 1993

Attest:

STEPHEN G. KUNIN

*Attesting Officer*   Acting Commissioner of Patents and Trademarks